(12) United States Patent
Derbyshire

(10) Patent No.: US 7,409,862 B2
(45) Date of Patent: Aug. 12, 2008

(54) SYSTEMS AND METHODS FOR ISOLATION OF TORQUE AND SENSE CAPACITORS OF AN ACCELEROMETER

(75) Inventor: Mark T. Derbyshire, Kirkland, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/550,630

(22) Filed: Oct. 18, 2006

(65) Prior Publication Data

US 2008/0092654 A1 Apr. 24, 2008

(51) Int. Cl.
G01P 15/125 (2006.01)
(52) U.S. Cl. .................................... 73/514.32
(58) Field of Classification Search ............. 73/514.32, 73/514.17, 514.18, 514.36, 514.38, 514.29, 73/514.16
See application file for complete search history.

(56) References Cited

U.S. PATENT DOCUMENTS

| 5,331,852 | A | * | 7/1994 | Greiff et al. ............. 73/504.09 |
| 5,383,364 | A | | 1/1995 | Takahashi et al. |
| 5,392,650 | A | * | 2/1995 | O'Brien et al. .......... 73/514.18 |
| 5,783,973 | A | * | 7/1998 | Weinberg et al. ............. 331/35 |
| 2004/0183149 | A1 | | 9/2004 | Schenk |
| 2006/0156818 | A1 | | 7/2006 | Kapser et al. |

FOREIGN PATENT DOCUMENTS

| GB | 2320571 | 6/1998 |
| WO | 2008010931 | 1/2008 |

* cited by examiner

Primary Examiner—Helen C. Kwok
(74) Attorney, Agent, or Firm—Black Lowe & Graham PLLC

(57) ABSTRACT

A Micro Electromechanical Systems (MEMS) accelerometer device having a proof mass flexibly attached to a substrate. The device includes one or more sense capacitors formed between the proof mass and the substrate, one or more torque capacitors formed between the proof mass and the substrate, and an isolation device that electrically isolates cathodes of the sense capacitors from cathodes of the torque capacitors on the proof mass.

16 Claims, 4 Drawing Sheets

SYSTEMS AND METHODS FOR ISOLATION OF TORQUE AND SENSE CAPACITORS OF AN ACCELEROMETER

BACKGROUND OF THE INVENTION

Accelerometer mechanisms currently used in common guidance have a common electrical node known as the "mech node". When these mechanisms are used with High Performance Accelerometer ("HPA") style electronics (see FIG. 1), the "mech node" serves as the connection to a front-end trans-impedance amplifier. Current from sense capacitors ($C_{SGR}$, $C_{SGL}$) flows through the trans-impedance amplifier feedback capacitance and is detected by the system as proportional to gravity (g-input). However, the desired current from the sense capacitors includes noise as produced by the current from the torque capacitors ($C_{TG}$). Any imbalance associated with the torque capacitances will result in undesired torque current injected through the trans-impedance amplifier feedback capacitance. The larger the imbalance, the larger the noise will be relative to the sense capacitor signal.

Therefore, there exists a need to remove noise in an HPA device.

SUMMARY

The present invention provides a Micro Electromechanical Systems (MEMS) accelerometer device having a proof mass flexibly attached to a substrate. The device includes one or more sense capacitors formed between the proof mass and the substrate, one or more torque capacitors formed between the proof mass and the substrate, and an isolation device that electrically isolates cathodes of the sense capacitors from cathodes of the torque capacitors on the proof mass.

The isolation device includes a trough within the proof mass that is located between the cathodes of the sense capacitors and the cathodes of the torque capacitors. In one aspect of the invention the trough includes at least one of an oxide layer and a bead of poly-silicon.

In another aspect of the invention, the isolation device includes circuitry for electrically isolating the anodes of the sense capacitors from the anodes of the torque capacitors and the cathodes of the sense capacitors from the cathodes of the torque capacitors.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
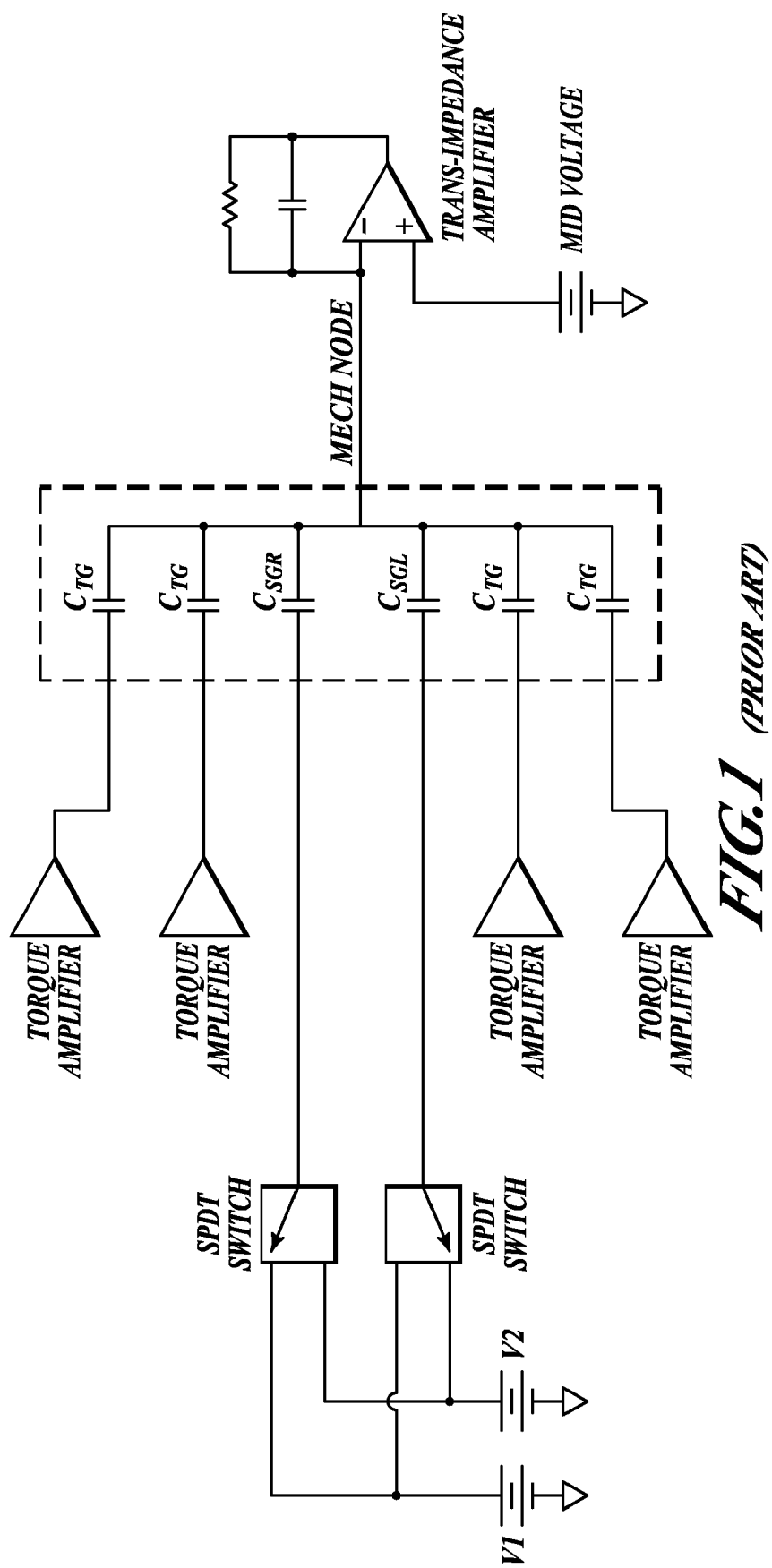
FIG. 1 is a diagram of a circuit formed in accordance with the prior art.
Figure 2:
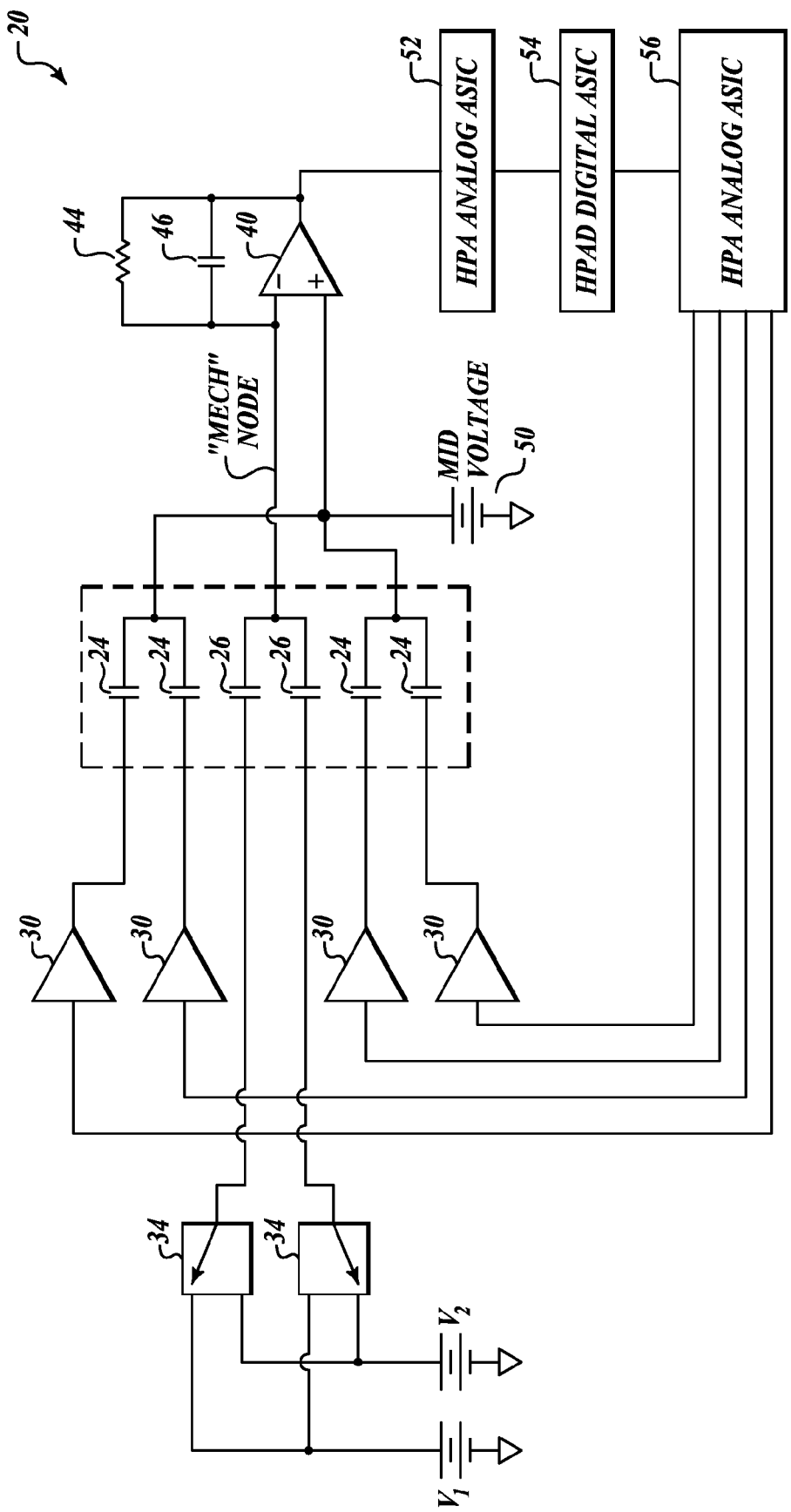
FIG. 2 is an example diagram illustrating a circuit formed in accordance with an embodiment of the present invention.

FIG. 2 illustrates a diagram of an example circuit 20 formed in accordance with the embodiment of the present invention. In this example, the circuit 20 includes four torque capacitors 24 and two sense capacitors 26. The circuit 20 also includes torque amplifiers 30 that are connected to each of the anodes of the torque capacitors 24. Single pole double throw (SPDT) switches 34 are connected between voltage sources $V_1$ and $V_2$ and the anodes of the sense capacitors 26. The cathodes of the sense capacitors 26 are connected to a negative lead of a trans-impedance amplifier 40. The amplifier 40 is connected in parallel with a capacitor 46 and a resistor 44. The cathodes of the torque capacitors 24 are connected to a positive lead of the trans-impedance amplifier 40 and a MID-voltage 50. The output of the trans-impedance amplifier 40 is connected to opposite ends of the resistor 44 and the capacitor 46 and are connected to an analog application specific integrated circuit (ASIC) 52. A digital ASIC 54 is connected to the output of the analog ASIC 52. Another analog ASIC 56 is coupled to the output of the digital ASIC 54 and the input of the torque amplifiers 30. The HPA Analog ASICs (52 and 56) are typically a single Analog ASIC even though it is shown as two devices in FIG. 2.

As will be shown in later figures, the torque capacitors 24 and sense capacitors 26 are connected between a proof mass and associated substrate. The sense capacitors 26 change capacitance when the proof mass moves relative to the substrate. This changing capacitance is amplified by the trans-impedance amplifier 40 and sent through the ASICs 52, 54 and 56 which produce a closed loop signal that is applied through the torque amplifier 30 to the torque capacitors 24. The torque capacitors 24 then apply a force to the proof mass in order to keep the proof mass in a steady state position. Thus, in this example, the circuit 20 is a closed loop accelerometer.

The ASICS 52, 54, and 56 perform standard force sensing and closed loop functionality. For example, the ASIC 52 includes a variable gain stage and an analog to digital converter. The digital ASIC 54 determines the force that has been applied to the proof mass and generates an output analog signal. The second analog ASIC 56 performs filtering of the signal outputted from the digital ASIC 54 and makes an input compatible for the torque amplifiers 30. Examples of the circuitry for the ASICS 52, 54 and 56 and their functionality are described in more detail in U.S. Pat. No. 5,600,487, the contents of which are herein incorporated by reference. The torque capacitors 24 are electrically isolated from the sense capacitors 26. Any noise caused by the torque capacitor 24 is rerouted from the output of the sense capacitors 26 to the MID-voltage 50, thereby producing a cleaner signal from the sense capacitors 26.

Figure 3:
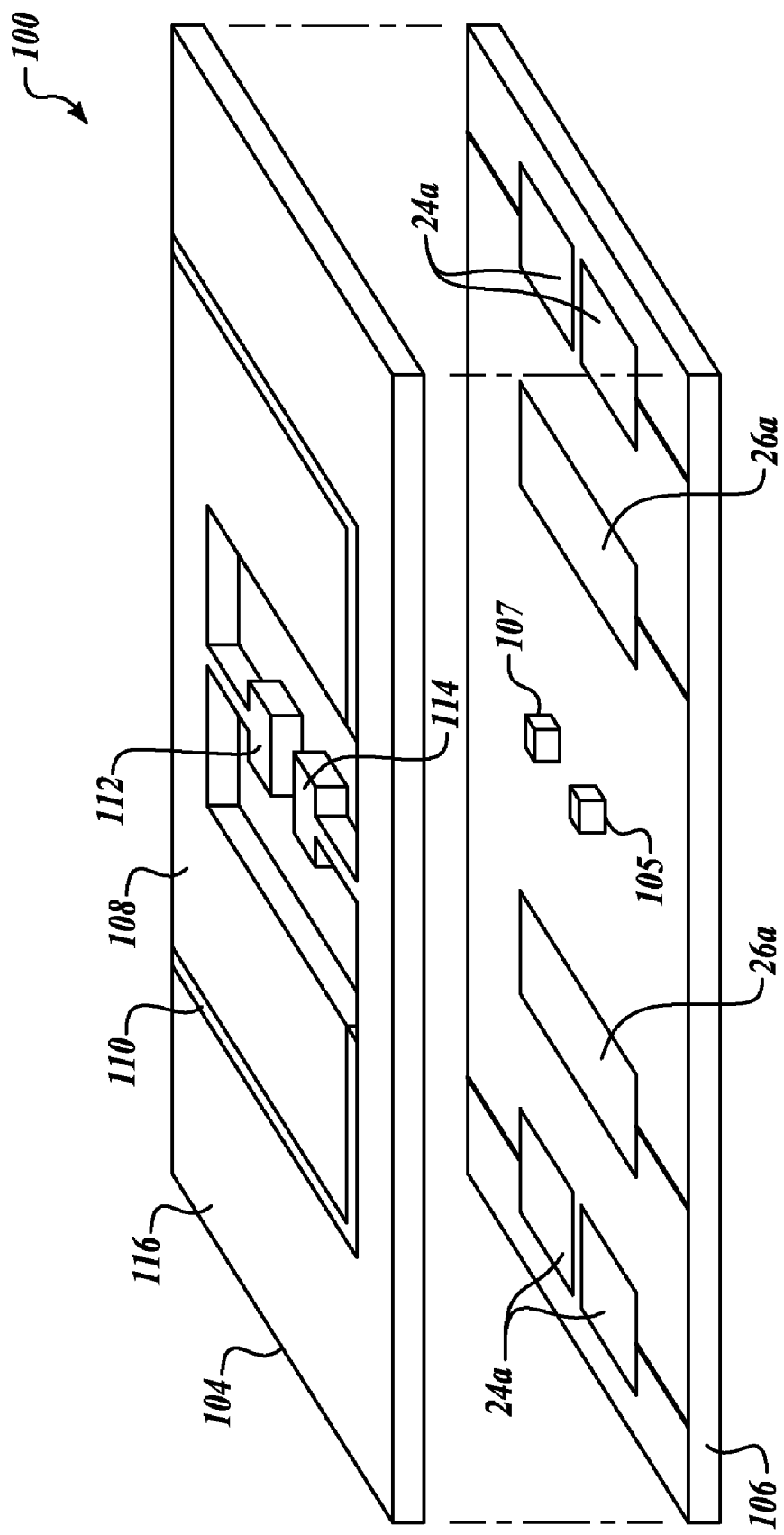
FIG. 3 illustrates an exploded perspective view portion of an accelerometer formed in accordance with an embodiment of the present invention.

FIG. 3 illustrates an exploded perspective view of a portion of an accelerometer 100 formed in accordance with embodiment of the present invention. The accelerometer 100 includes a device layer 104 (doped silicon) that is attached to mounting posts 105, 107 on a substrate 106. In one embodiment, the substrate 106 is made of Pyrex® or similar substance and includes metallic deposits 24a that form one side of the torque capacitors 24 and metallic deposits 26a that form one side of the sense capacitors 26. The device layer 104 also includes a trench 110 that electrically isolates a sense section 108 from a torque section 116.

The device layer 104 includes pads 112 and 114 that are anodically bonded to the posts 105 and 107 on the substrate 106. The posts 105 and 107 are electrically connected to respective external circuitry, such as that shown in FIG. 2. When the pads 112 and 114 are bonded to the respective posts 105 and 107 on the substrate 106, a capacitive gap is formed between the pads 24a and the torque section 116 to form the torque capacitors 24 and a capacitive gap is formed between the pads 26a and the sense section 108 to form the sense capacitors 26. When the device layer 104 flexes due to a sensed force, an acceleration force is determined based on a capacitance sensed by the sense capacitors 26.

Figure 4A:
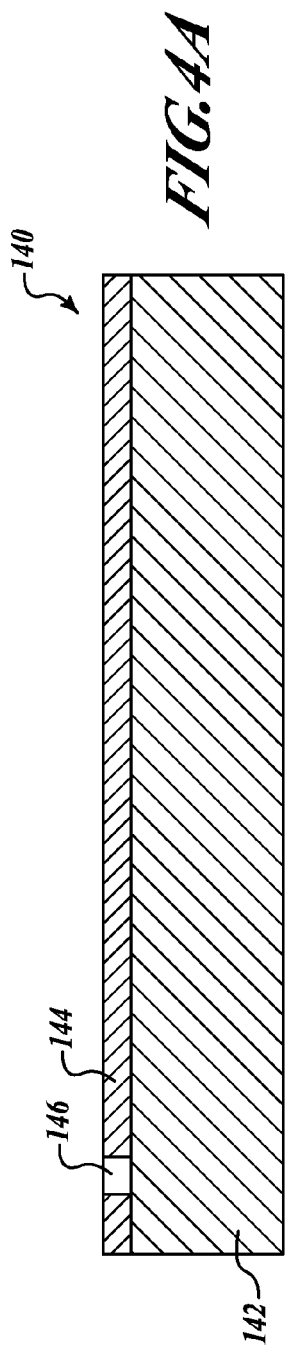
FIGS. 4A-4D illustrate a cross sectional view of production stages in forming the accelerometer shown in FIG. 3.

FIGS. 4A-D illustrate cross-sectional views of intermediate structures formed during the creation of the device layer 104 (FIG. 3A). FIG. 4A illustrates a chip 140 having a handle layer 142, such as silicon, and a device layer 144, which is a layer of highly doped silicon, that is applied to a first side of the handle layer 142. The device layer 144 is then masked and etched to form a trough 146. The trough 146 exposes a portion of the surface of the handle layer 142.

Figure 4B:
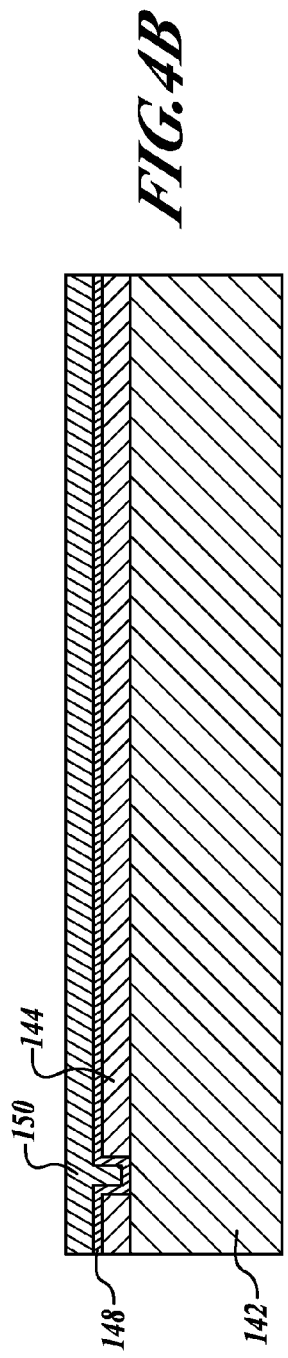
Figure 4C:
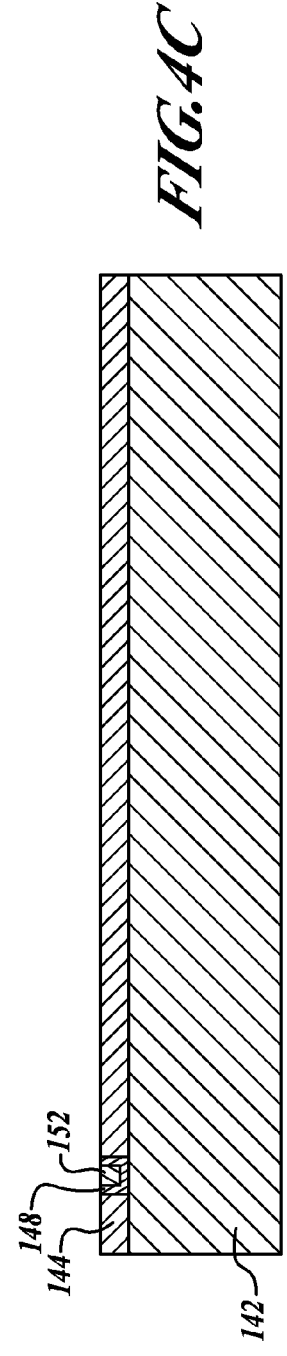
Figure 4D:
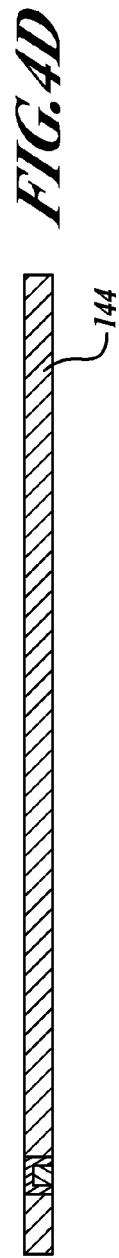

Next, as shown in FIG. 4B, an oxide layer 148 is grown over the device layer 144 and into the trough 146. Next, a layer 150 of poly-silicon is deposited on the oxide layer 148. Next as shown in FIG. 4C, the poly-silicon layer 150 and the oxide layer 148 are removed down to the top surface of the device layer 144 using various etching or sanding techniques. What remains is the trough 146 filled with the oxide layer 148 and a bead 152 of poly-silicon. Next, the pads 112 and 114 are etched (not shown). Finally, as shown in FIG. 4D, the handle layer 142 is removed and the device layer 144 is ready for bonding to the substrate 106.

While the preferred embodiment of the invention has been illustrated and described, as noted above, many changes can be made without departing from the spirit and scope of the invention. For example, the steps in the fabrication may be performed in various order to produce the same product. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A Micro Electromechanical Systems (MEMS) accelerometer device having a proof mass flexibly attached to a substrate, the device comprising:
    one or more sense capacitors formed between the proof mass and the substrate;
    one or more torque capacitors formed between the proof mass and the substrate; and
    an isolation device configured to electrically isolate cathodes of the sense capacitors from cathodes of the torque capacitors on the proof mass.

2. The device of claim 1, wherein the isolation device includes a trough within the proof mass located between the cathodes of the sense capacitors and the cathodes of the torque capacitors.

3. The device of claim 2, wherein the trough includes at least one of an oxide layer and a bead of poly-silicon.

4. The device of claim 1, wherein the isolation device includes circuitry for electrically isolating anodes of the one or more sense capacitors from anodes of the one or more torque capacitors and the cathodes of the one or more sense capacitors from the cathodes of the one or more torque capacitors.

5. The device of claim 4, further comprising a Mid-voltage source that is electrically connected to the cathodes of the one or more torque capacitors.

6. The device of claim 5, further comprising a mechanism node that is electrically connected to the cathodes of the one or more sense capacitors.

7. The device of claim 6, further comprising first and second input voltage sources and one or more switches connected between the first and second input voltage sources and the anodes of the one or more sense capacitors.

8. The device of claim 7, further comprising a trans-impedance amplifier that is connected to the mechanism node.

9. A method of making a Micro Electromechanical Systems (MEMS) accelerometer having a proof mass flexibly attached to a substrate, the method comprising:
    forming one or more sense capacitors between the proof mass and the substrate;
    forming one or more torque capacitors between the proof mass and the substrate;
    electrically isolating cathodes of the one or more sense capacitors from cathodes of the one or more torque capacitors.

10. The method of claim 9, wherein electrically isolating includes forming a trough within the proof mass between the cathodes of the one or more sense capacitors and the cathodes of the one or more torque capacitors.

11. The method of claim 10, wherein forming the trough includes applying at least one of an oxide layer and a bead of poly-silicon within the trough.

12. The method of claim 9, wherein electrically isolating includes forming circuitry configured to electrically isolate anodes of the one or more sense capacitors from anodes of the one or more torque capacitors and the cathodes of the one or more sense capacitors from the cathodes of the one or more torque capacitors.

13. The method of claim 12, wherein the formed circuitry electrically connects a Mid-voltage source to the cathodes of the one or more torque capacitors.

14. The method of claim 13, wherein the formed circuitry electrically connects the cathodes of the one or more sense capacitors to a mechanism node.

15. The method of claim 14, wherein the formed circuitry electrically connects first and second input voltage sources to the anodes of the one or more sense capacitors via one or more switches.

16. The method of claim 15, wherein the mechanism node is electrically connected to a trans-impedance amplifier.

* * * * *